United States Patent
Ito et al.

(10) Patent No.: US 7,605,514 B2
(45) Date of Patent: Oct. 20, 2009

(54) ELECTRIC MACHINE

(75) Inventors: Kazumasa Ito, Tokyo (JP); Kouki Naka, Tokyo (JP); Masatsugu Nakano, Tokyo (JP); Manabu Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 318 days.

(21) Appl. No.: 11/623,125

(22) Filed: Jan. 15, 2007

(65) Prior Publication Data
US 2007/0194650 A1    Aug. 23, 2007

(30) Foreign Application Priority Data
Feb. 20, 2006  (JP)  ............................. 2006-042117

(51) Int. Cl.
*H02K 1/00*  (2006.01)
(52) U.S. Cl. .................... 310/180; 310/179; 310/254
(58) Field of Classification Search ......... 310/179–184, 310/198, 51, 254, 261
See application file for complete search history.

(56) References Cited

U.S. PATENT DOCUMENTS

| | | | |
|---|---|---|---|
| 5,006,745 A | | 4/1991 | Nishio et al. |
| 5,233,253 A | | 8/1993 | Nishio et al. |
| 5,691,590 A | * | 11/1997 | Kawai et al. ................ 310/180 |
| 5,708,316 A | * | 1/1998 | Ishida ......................... 310/184 |
| 5,994,802 A | * | 11/1999 | Shichijyo et al. ............. 310/51 |
| 6,166,471 A | * | 12/2000 | Kometani et al. ........... 310/198 |
| 6,426,579 B1 | | 7/2002 | Oda et al. |
| 6,657,348 B2 | | 12/2003 | Qin et al. |
| 6,759,780 B2 | * | 7/2004 | Liu et al. .................... 310/184 |
| 6,788,031 B2 | * | 9/2004 | Pendell ....................... 322/44 |
| 6,894,413 B2 | | 5/2005 | Nakano et al. |
| 7,291,954 B2 | * | 11/2007 | Kashihara et al. .......... 310/184 |
| 2002/0167242 A1 | * | 11/2002 | Liu et al. .................... 310/184 |
| 2007/0108863 A1 | * | 5/2007 | Bischof et al. ............. 310/180 |

FOREIGN PATENT DOCUMENTS

| | | |
|---|---|---|
| JP | 2-142350 A | 5/1990 |
| JP | 6-90538 A | 3/1994 |
| JP | 8-289491 A1 | 11/1996 |
| JP | 2000-197290 A1 | 7/2000 |
| JP | 2001-054271 A1 | 2/2001 |
| WO | WO 03/055045 A1 | 7/2003 |

\* cited by examiner

*Primary Examiner*—Thanh Lam
(74) *Attorney, Agent, or Firm*—Leydig, Voit & Mayer, Ltd.

(57) ABSTRACT

In a rotating electric machine including a field pole unit having ten magnetic poles (P=10) and an armature having twelve teeth (Q=12), armature coils are wound around the successive teeth with phase relationships and winding polarities arranged in the order of U+/U+, U−/V+, V−/V−, W−/V+, W+/W+, W−/U+, U−/U−, U+/V−, V+/V+, W+/V−, W−/W− and W+/U−, where "U," "V" and "W" represent three phases of the individual armature coils while "+" and "−" denote winding polarities. Among all harmonic components of magnetomotive forces produced by the armature coils, harmonic components of orders lower than a synchronized component can be reduced in this rotating electric machine. This structure decreases eddy currents flowing in the field pole unit, resulting lower eddy current loss in the field pole unit of the rotating electric machine.

13 Claims, 10 Drawing Sheets

FIG. 1 APPROVED: /TL/ (07/05/2009)
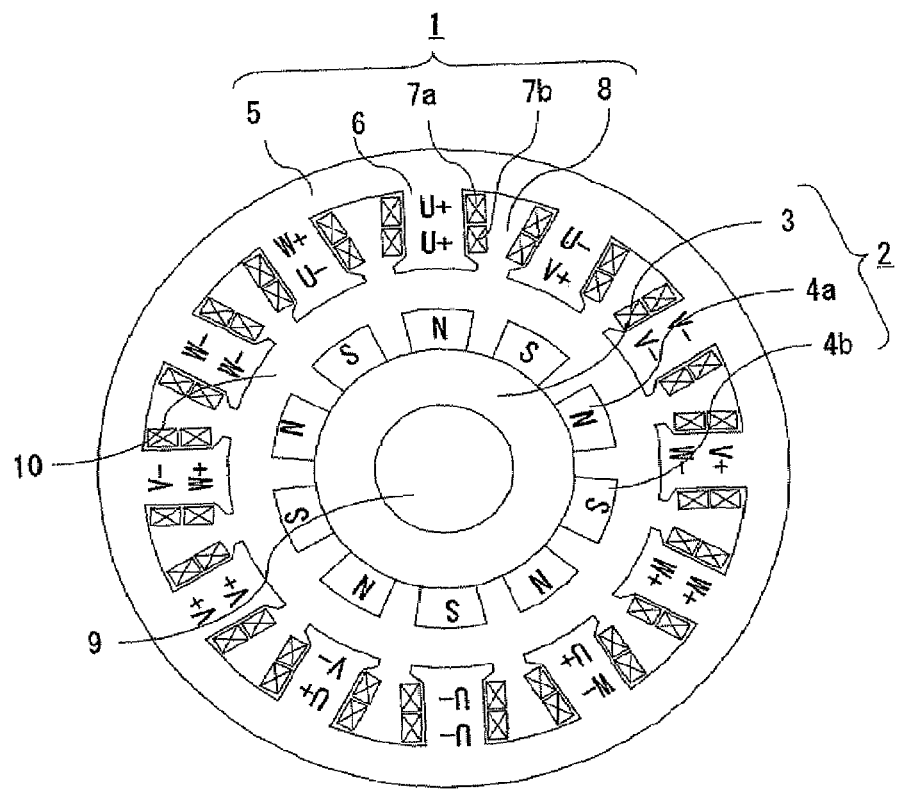
FIG. 2
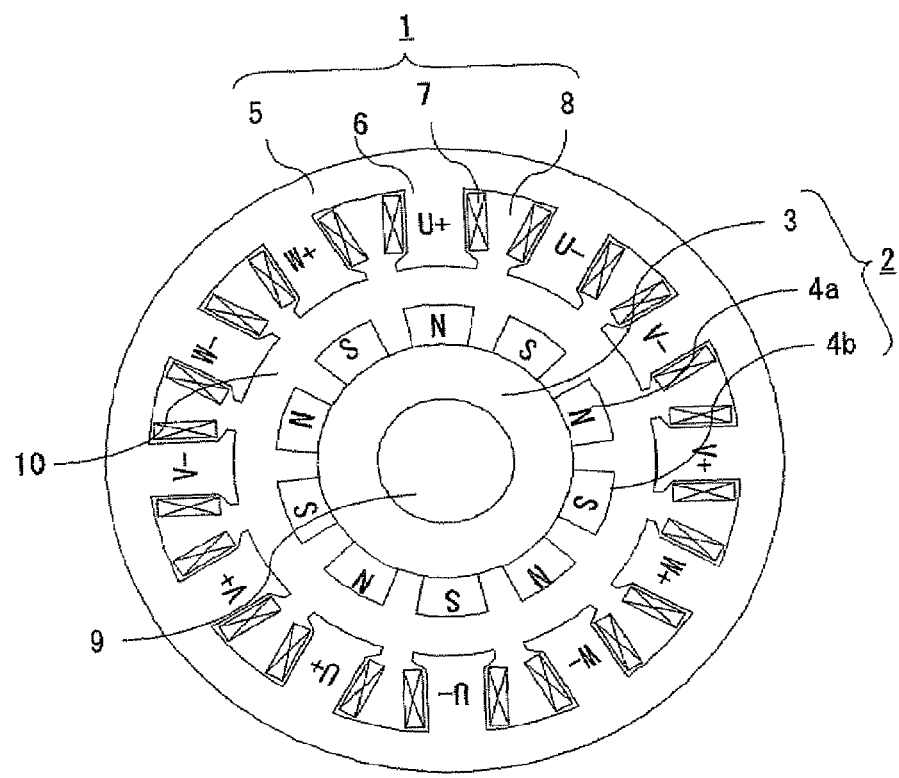

ELECTRIC MACHINE

BACKGROUND OF THE INVENTION

1. Field of the Invention

The present invention relates to an electric machine, such as a rotating electric machine or a linear motor, as well as to a technique for reducing eddy current loss which occurs in a field pole unit.

2. Description of the Background Art

Conventionally, a rotating electric machine provided with a field pole unit having a plurality of permanent magnets and an armature including concentratedly wound armature coils has been used in various applications. "Concentrated winding" is a coil-winding structure in which coils are concentratedly wound on teeth of an armature. As a result of recent advances in machine-assisted automatic coil-winding techniques, concentrated winding is widely used today in the manufacture of rotating electric machines, chiefly for compact motors including servomotors. A majority of energy loss occurring in such small-sized motors is attributed to copper loss, iron loss and mechanical loss, so that the eddy current loss occurring in the field pole unit does not usually pose a serious problem.

Although large-sized motors whose wattage exceeds a few kilowatts have conventionally been provided with an armature including distributedly wound armature coils, it is increasingly desired to employ concentratedly wound armature coils having smaller coil ends to achieve space savings. In fact, there is a strong need today for size reduction of the coil ends in motors used as an elevator traction machine or a motor for directly driving a stage of a machine tool, for example.

In large-sized motors rated over a few kilowatts, however, eddy current loss occurring in a field pole unit constitutes an appreciable part of a total energy loss. In addition, magnets like rare-earth magnets characterized by high remnant magnetic flux density and high remanence have increasingly been used as field pole magnets in recent years. For example, neodymium-iron-boron (Nd—Fe—B) permanent magnets often used as field pole magnets today tend to produce eddy currents as compared to ferrite permanent magnets, and thus have a problem that an eddy current loss occurring in a field pole unit causes a reduction in motor efficiency and a temperature increase of the field pole unit results in demagnetization of the field pole magnets. Even if the field pole magnets are not demagnetized, the temperature increase of the field pole unit would cause a reduction in the remnant magnetic flux density and a resultant decrease in a total quantity of magnetic flux produced by the field pole magnets. To make up for a loss in motor power caused by this temperature increase of the field pole unit, it is necessary to flow an increased amount of armature current, which causes a problem that the motor efficiency further decreases due to an increase in copper loss.

It might be possible to reduce the eddy current loss by employing a laminated core built up of laminations of steel sheets and distributedly winding armature coils to suppress magnetic field harmonics produced by armature currents. A conventional approach directed to the solution of the aforementioned problems is described in Japanese Patent Application Publication No. 1996-289491. According to the Publication, a core carrying field poles is built up of a plurality of blocks formed by laminating multiple steel sheets, in which the steel sheets are electrically insulated in a laminating direction thereof to prevent eddy current loss occurring in a field pole unit. Another conventional approach is shown in Japanese Patent No. 3280351, in which a core is not a laminated core but built up of a plurality of solid yokes carrying field poles. In this approach, the solid yokes are electrically separated from one another so that a path through which eddy currents will flow is not created.

The prior art to which the invention is directed discloses structures in which the core (field pole yoke) is built up of laminated steel sheets or of electrically separated, or divided, solid yokes to prevent the eddy current loss occurring in the field pole unit as mentioned above. The former approach has a problem that the laminated field pole yoke structure requires an capital investment in manufacturing equipment including a large-sized metal die and press, resulting in high manufacturing cost. The latter approach also has a problem that the divided solid yoke structure requires greater manpower or complex processes due to an increase in the number of constituent components, resulting in high manufacturing cost. Additionally, the divided solid yoke structure could produce uneven magnetic flux densities in a magnetic gap formed between the field pole unit and a armature due to uneven thickness of insulating material inserted between one solid yoke and another, eventually causing acoustic noise or vibration. On the other hand, motors with distributedly wound armature coils have a problem that these motors have large coil ends.

SUMMARY OF THE INVENTION

In light of the aforementioned problems of the prior art, it is an object of the invention to provide a low-cost electric machine capable of reducing eddy current loss occurring in a field pole unit.

According to the invention, an electric machine includes an armature and a field pole unit which are disposed relatively movably along a magnetic gap formed in between. The armature includes an armature core having a plurality of teeth extending toward the magnetic gap at specific intervals along a relative moving direction of the armature and the field pole unit, and a plurality of armature coils concentratedly wound around the individual teeth to flow phase currents from a three-phase alternating current (AC) power supply. The field pole unit has a specific number of magnetic poles arranged along the aforementioned relative moving direction. In this electric machine of the invention, the plurality of teeth include at least one tooth around which at least two armature coils for flowing different phase currents are wound to reduce harmonic components of magnetomotive forces produced by the armature coils when the electric machine is operated, in which the reduced harmonic components are of lower orders than a component synchronized with the relative moving speed of the armature and the field pole unit.

In this electric machine of the invention, the plurality of teeth include at least one tooth around which at least two armature coils for flowing different phase currents are wound so that the different phase currents fed from the three-phase AC power supply flow through these armature coils to reduce, in particular, the harmonic components of lower orders than the component synchronized with the relative moving speed of the armature and the field pole unit as described above. This structure of the invention eliminates the need for employing the earlier-described costly laminated field pole yoke structure or divided solid yoke structure of the prior art, making it possible to lower eddy current loss occurring in the field pole unit at low cost.

The foregoing and other objects, features, aspects and advantages of the present invention will become more apparent from the following detailed description when read in conjunction with the accompanying drawings.

BRIEF DESCRIPTION OF THE DRAWINGS

FIG. 1 is a sectional diagram showing the structure of an electric machine according to a first embodiment of the invention;

FIG. 2 is a sectional diagram showing the structure of a conventional rotating electric machine used as a comparative example;

DESCRIPTION OF THE PREFERRED EMBODIMENTS

Figure 3:
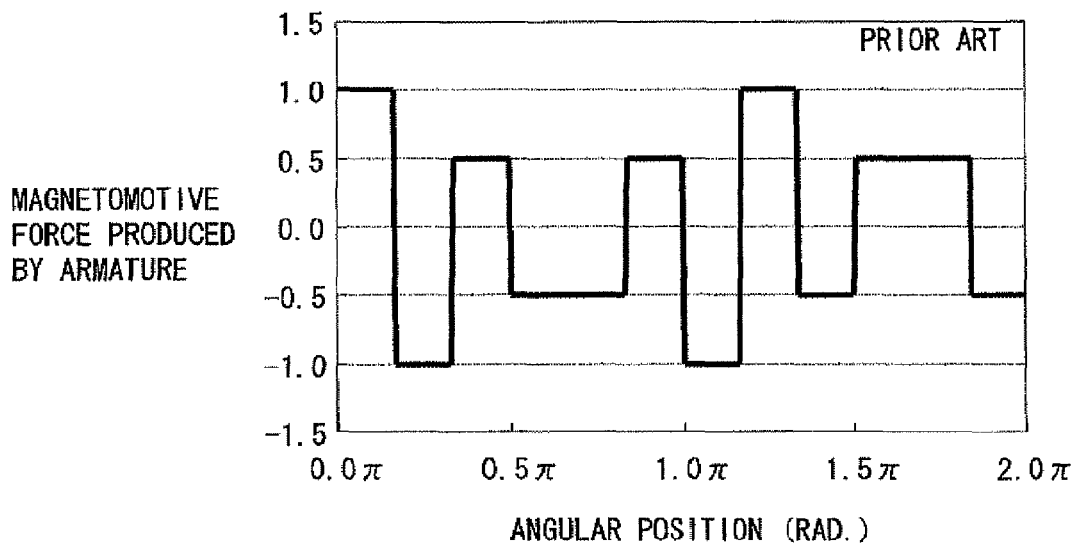
FIG. 3 is a graph showing a distribution of magnetomotive forces produced by an armature of the conventional rotating electric machine of FIG. 2.

Now, specific embodiments of the present invention are described, by way of example, with reference to the accompanying drawings.

First Embodiment

FIG. 1 is a sectional diagram showing the structure of an electric machine according to a first embodiment of the invention. This electric machine is a 3-phase, 10-pole, 12-tooth rotating electric machine including an armature 1 and a field pole unit 2 which are disposed relatively rotatably by means of retaining devices, such as bearings, with a magnetic gap 10 created in between. The field pole unit 2 includes a field pole core 3 mounted on a shaft 9 and five pairs (ten in total) of north-pole (N-pole) permanent magnets 4a and south-pole (S-pole) permanent magnets 4b, which may be referred to simply as the permanent magnets 4 collectively, attached to the field pole core 3. While each of the permanent magnets 4a, 4b constitutes one magnetic pole as illustrated in FIG. 1, the electric machine is not specifically limited to this example in terms of permanent magnet configuration. Also, although the permanent magnets 4a, 4b are arranged on an outer surface of the field pole core 3 as illustrated, the permanent magnets 4a, 4b may be embedded inside the field pole core 3.

The armature 1 includes an armature core 5 having a total of twelve teeth 6 and concentratedly wound coils 7a, 7b which are fitted in slots 8 formed between the successive teeth 6 of the armature core 5. The teeth 6 extend inward along radial directions of the armature 1 toward the magnetic gap 10 at 30-degree intervals around the field pole unit 2. In the electric machine of the embodiment, two coils 7a, 7b are wound around each tooth 6. The coils 7a, 7b are wound around the successive teeth 6 with phase relationships and winding polarities arranged in the order of U+/U+, U−/V+, V−/V−, W−/V+, W+/W+, W−/U+, U−/U−, U+/V−, V+/V+, W+/V−, W−/W− and W+/U− in a clockwise direction from top as illustrated in FIG. 1, where "U", "V" and "W" represent phases of the individual coils 7a, 7b while "+" and "−" signs denote winding polarities, or directions, thereof. It is to be noted that the two coils 7a, 7b wound on each tooth 6 may be laid in any order (outer or inner) in each slot 8. This means that the coils 7a, 7b designated "U+/V−" in FIG. 1 may be laid oppositely, or in an order of "V−/U+" radially, for example.

FIG. 2 is a sectional diagram showing the structure of a conventional 3-phase, 10-pole, 12-tooth rotating electric machine used as a comparative example. In an armature 1 of this comparative example, only one coil 7 is wound around each tooth 6. The coils 7 are wound around the successive teeth 6 with phase relationships and winding polarities in the order of U+, U−, V−, V+, W+, W−, U−, U+, V+, V−, W− and W+ in the clockwise direction from top as illustrated in FIG. 2. If 3-phase (U, V, W) currents having a mutual phase difference of 2π/3 are flowed through the coils 7 of the rotating electric machine of FIG. 2, the armature 1 produces magnetomotive forces in a magnetic gap 10, the magnetomotive forces being distributed as shown in FIG. 3 at a given point in time.

Since a field pole unit 2 of this rotating electric machine has 10 poles as shown in FIG. 2, the magnetomotive force synchronized with the rotation of the field pole unit 2 is a 5th-order spatial harmonic component. The magnetomotive forces produced by the armature 1 are distributed in generally rectangular form as shown in FIG. 3, so that the magnetomotive forces contain a number of harmonic components (asynchronous components) besides the synchronized component. These harmonic components can be determined by developing the distribution of the magnetomotive forces produced by the armature 1 (shown in FIG. 3) into a Fourier series.

Figure 4:
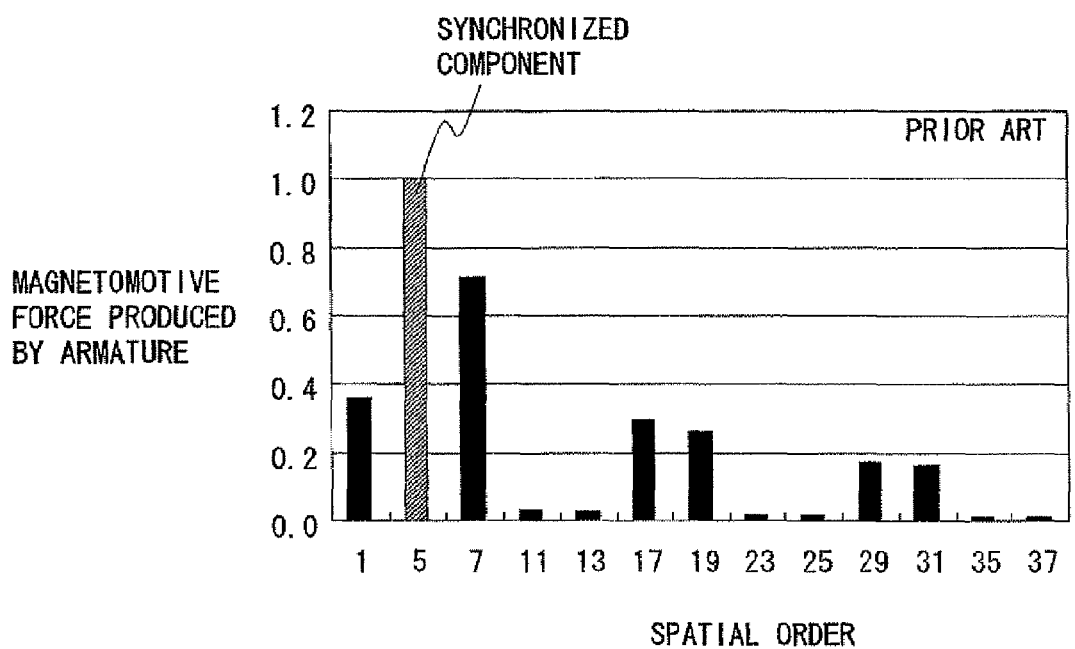
FIG. 4 is a graph showing components of individual orders of the magnetomotive forces produced by the armature of the conventional rotating electric machine of FIG. 2.

FIG. 4 is a graph showing the individual harmonic components obtained by developing the distribution of the magnetomotive forces shown in FIG. 3 into a Fourier series, in which the 5th-order spatial harmonic component which is the synchronized component is normalized to 1.0. As shown in FIG. 4, a 1st-order spatial harmonic component is approximately 0.36 and a 7th-order spatial harmonic component is approximately 0.71 in terms of normalized level.

As the 5th-order spatial harmonic component which is the synchronized component of the magnetomotive forces produced by the armature 1 shifts in a circumferential direction at the same speed as the rotating speed of the field pole unit 2, the 5th-order spatial harmonic component seems stationary when viewed from the field pole unit 2. It follows that the 5th-order spatial harmonic component produces no eddy current because there is no fluctuation in magnetic flux within the field pole core 3 or the permanent magnets 4. The asynchronous components of the magnetomotive forces produce eddy currents because the asynchronous components which appear shifting as viewed from the field pole unit 2 cause fluctuations in the magnetic flux.

Generally, if armature coils are concentrated windings, the higher the order of the magnetomotive force components produced by the armature 1, the more magnetic fields go into the magnetic gap 10 and are less linked to the field pole unit 2. This means that the lower the order of the magnetomotive force components, the more the magnetic fields are linked to the field pole unit 2, producing a larger amount of eddy currents. This problem is characteristic of concentratedly wound armature coils, because distributedly wound armature coils do not produce low-order magnetomotive forces.

In the rotating electric machine of the first embodiment, a pair of coils 7a, 7b is wound around each tooth 6 so that two different phase currents taken from three-phase (U, V, W) AC currents flow through the coils 7a, 7b wound around some of the teeth 6 as already described with reference to FIG. 1 in order to reduce magnetomotive force components of lower orders than the 5th-order spatial harmonic component which is the synchronized component of the magnetomotive forces produced by the armature 1.

Figure 5:
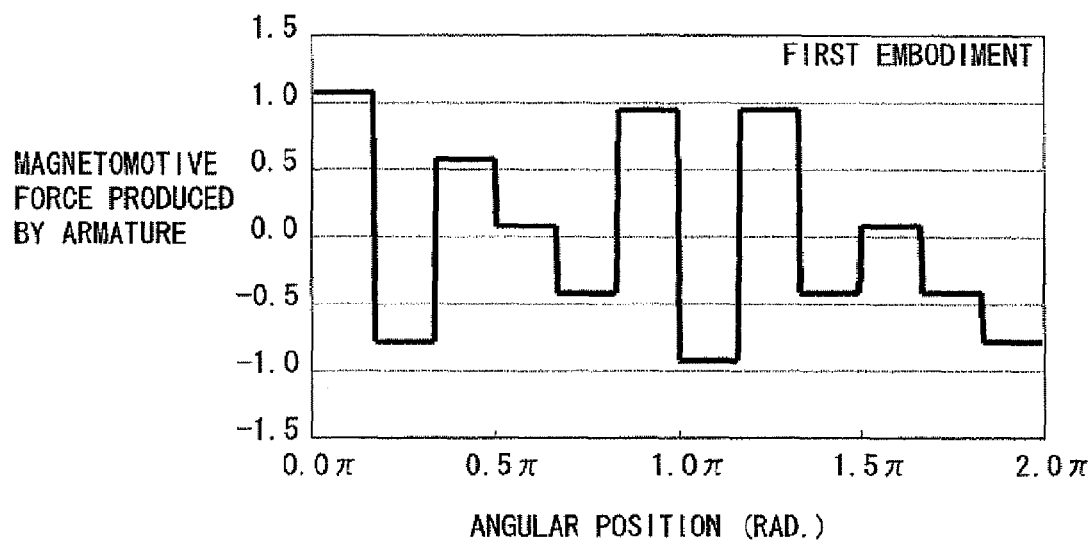
FIG. 5 is a graph showing a distribution of magnetomotive forces produced by an armature of the electric machine of the first embodiment.
Figure 6:
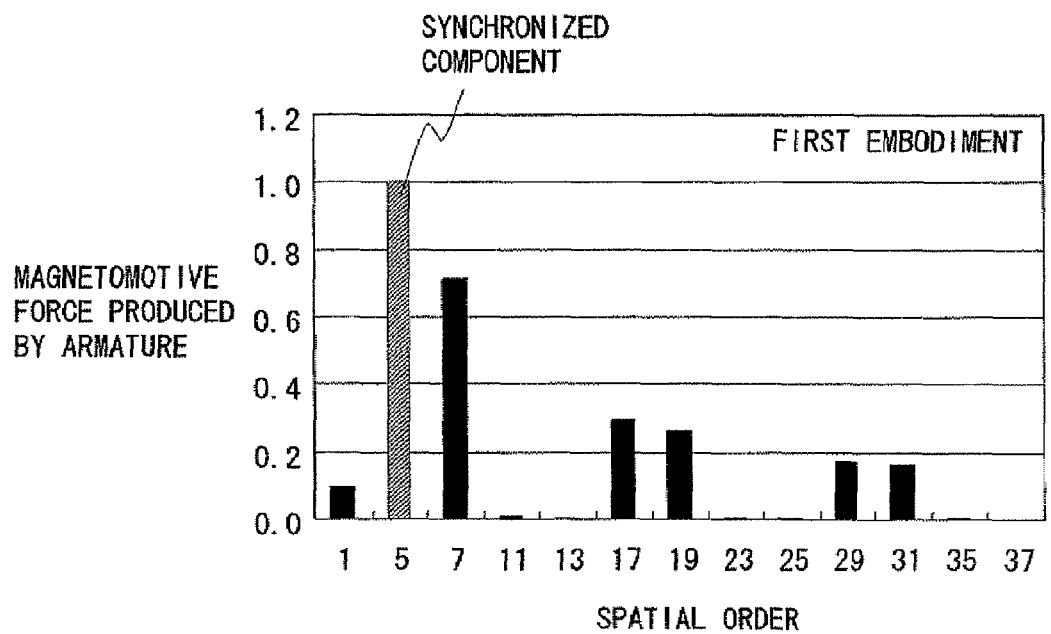
FIG. 6 is a graph showing components of individual orders of the magnetomotive forces produced by the armature of the electric machine of the first embodiment.

FIG. 5 is a graph showing a distribution of magnetomotive forces produced by the armature 1 of the electric machine of the first embodiment shown in FIG. 1. FIG. 6 is a graph showing components of individual orders obtained by developing the distribution of the magnetomotive forces shown in FIG. 5 into a Fourier series, in which a 5th-order spatial harmonic component is normalized to 1.0 as in the case of FIG. 4.

As shown in FIG. 6, the 1st-order spatial harmonic component has a level of approximately 0.10, which is less than one third that of the conventional rotating electric machine shown in FIG. 4. The 7th-order spatial harmonic component shown in FIG. 6 has a level of approximately 0.7 which is the same as that of the conventional rotating electric machine.

Figure 7:
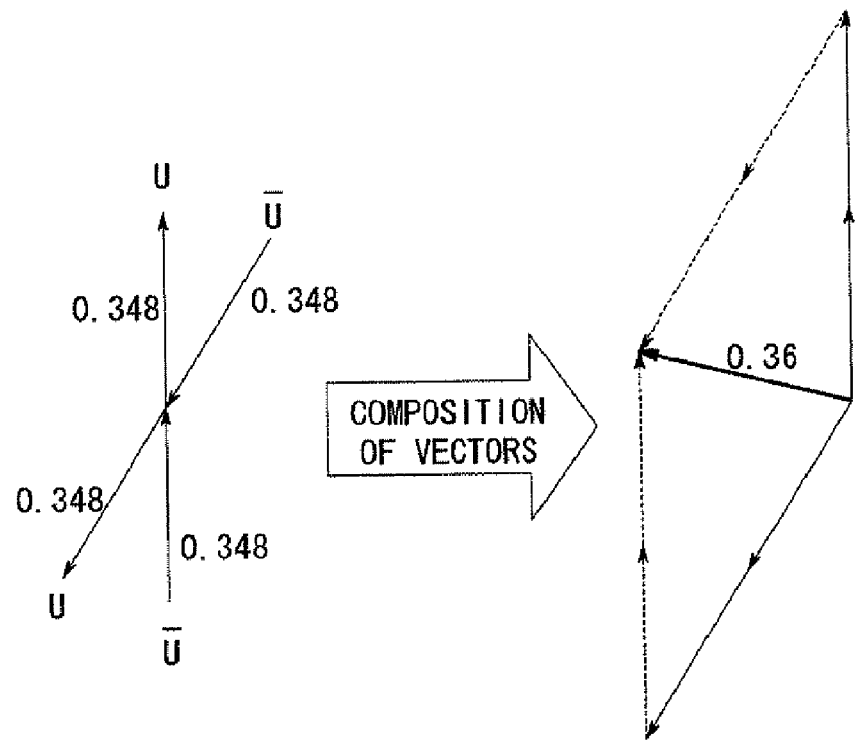
FIG. 7 is a vector diagram showing how vectors representing 1st-order spatial harmonic components produced by the armature of the conventional rotating electric machine of FIG. 2 are combined.
Figure 8:
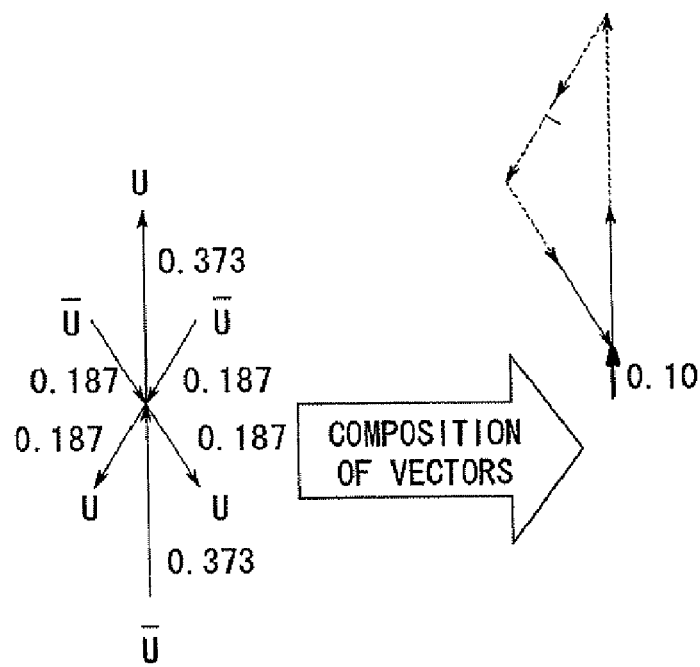
FIG. 8 is a vector diagram showing how vectors representing 1st-order spatial harmonic components produced by the armature of the electric machine of the first embodiment are combined.

FIGS. 7 and 8 are vector diagrams showing how vectors representing the 1st-order spatial harmonic components of the magnetomotive forces produced by the armature 1 are combined to yield a single resultant vector. Shown in FIGS. 7 and 8 are combined vectors of all the magnetomotive forces produced by the currents flowing through the U-phase coils 7 of the armatures 1 of the conventional rotating electric machine and the rotating electric machine of the first embodiment, respectively. In both examples, the magnitude of the 5th-order spatial harmonic component is normalized to 1.0. With this normalization, the 1st-order spatial harmonic components are 0.348 (FIG. 7) and 0.373 (FIG. 8) in terms of normalized level in the conventional rotating electric machine and the rotating electric machine of the first embodiment, respectively.

As can be seen from FIGS. 7 and 8, the magnitude of the combined vector representing the 1st-order spatial harmonic components is reduced in the first embodiment by concentratedly winding the two coils 7a, 7b on each tooth 6 to produce a larger number of diversely oriented vectors.

Generally, since eddy current loss is approximately proportional to the square of a magnetic field, the eddy current loss is proportional to the square of a resultant magnetomotive force produced by an armature. The vector diagrams of FIGS. 7 and 8 indicate that the eddy current loss occurring in the field pole unit 2 due to the 1st-order spatial harmonic component of the magnetomotive forces produced by the armature 1 can be reduced to one ninth or less in the rotating electric machine of the first embodiment as compared to the conventional rotating electric machine.

The above-described structure of the first embodiment can reduce the magnetomotive force components of lower orders than the synchronized component among all the harmonic components of the magnetomotive forces produced by the armature 1 that are not synchronized with magnetomotive forces produced by the field pole unit 2. Therefore, the structure of the embodiment can decrease eddy currents flowing in the field pole unit 2, making it possible to lower the eddy current loss occurring in the field pole unit 2. Since this structure serves to substantially decrease the eddy currents in this way, it becomes unnecessary to employ the earlier-mentioned laminated field pole yoke structure or divided solid yoke structure of the prior art, thus avoiding a cost increase which will result from a capital investment or an increased number of constituent components.

Second Embodiment

Figure 9:
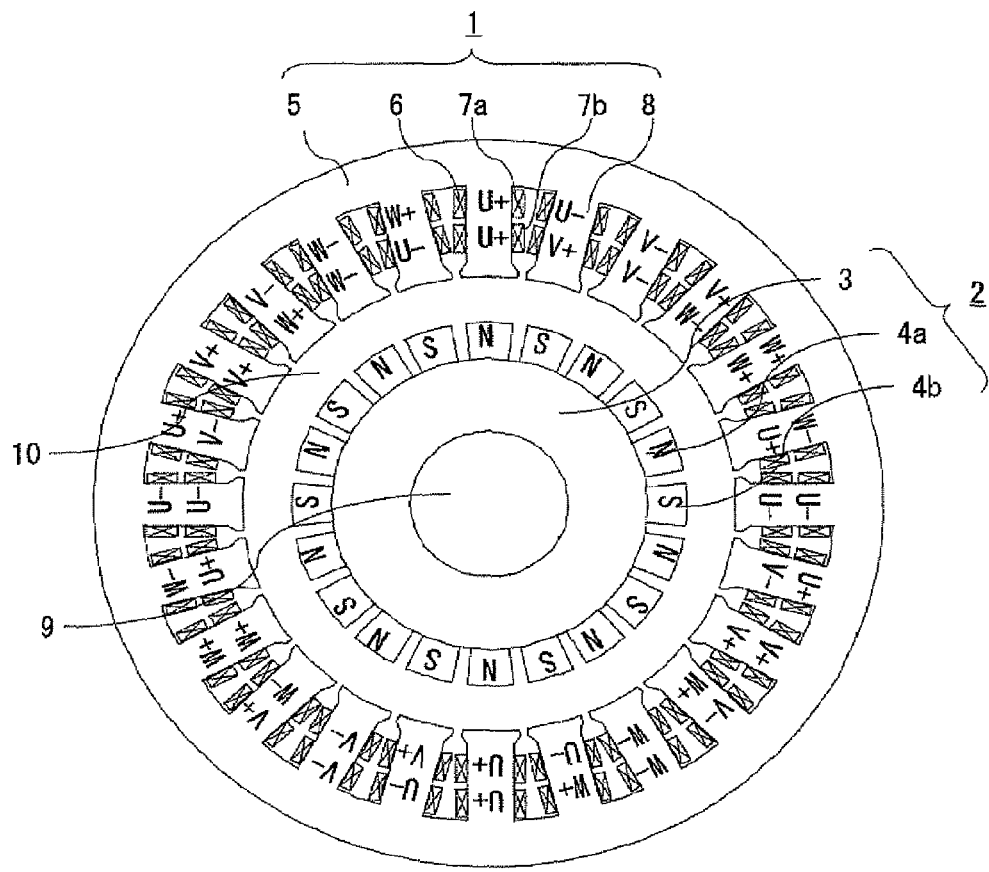
FIG. 9 is a sectional diagram showing the structure of an electric machine according to a second embodiment of the invention.

FIG. 9 is a sectional diagram showing the structure of an electric machine according to a second embodiment of the invention, in which elements identical or similar to those of the first embodiment are designated by like reference numbers. While the above-described electric machine of the first embodiment is a 10-pole, 12-tooth rotating electric machine, the electric machine of the second embodiment shown in FIG. 9 is a 3-phase, 20-pole, 24-tooth rotating electric machine. If the number of poles "P" and the number of teeth "Q" are expressed by P=5n and Q=6n, respectively, where "n" is any even number, the coils 7a, 7b should be wound around the successive teeth 6 with phase relationships and winding polarities arranged in the order of U+/U+, U−/V+, V−/V−, W−/V+, W+/W+, W−/U+, U−/U−, U+/V−, V+/V+, W+/V−, W−/W− and W+/U− in the clockwise direction from top as illustrated in FIG. 9, which is the same as shown in FIG. 1 but repeated twice.

Figure 10:
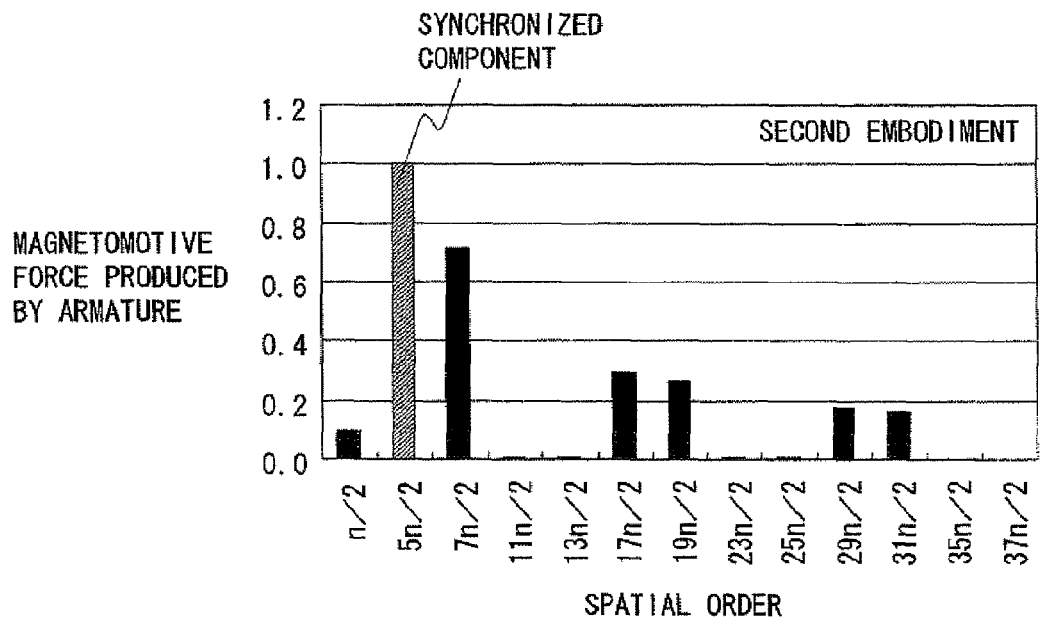
FIG. 10 is a graph showing components of individual orders of magnetomotive forces produced by an armature of the electric machine of the second embodiment.

In the structure of this embodiment, components of individual orders of magnetomotive forces produced by the armature 1 are distributed as shown in FIG. 10. With a (5n/2)th-order spatial harmonic component of the magnetomotive forces normalized to 1.0, an (n/2)th-order spatial harmonic component has a level of 0.10 as shown in FIG. 10. Thus, the structure of this embodiment can also lower the eddy current loss like the structure of the first embodiment.

Third Embodiment

Figure 11:
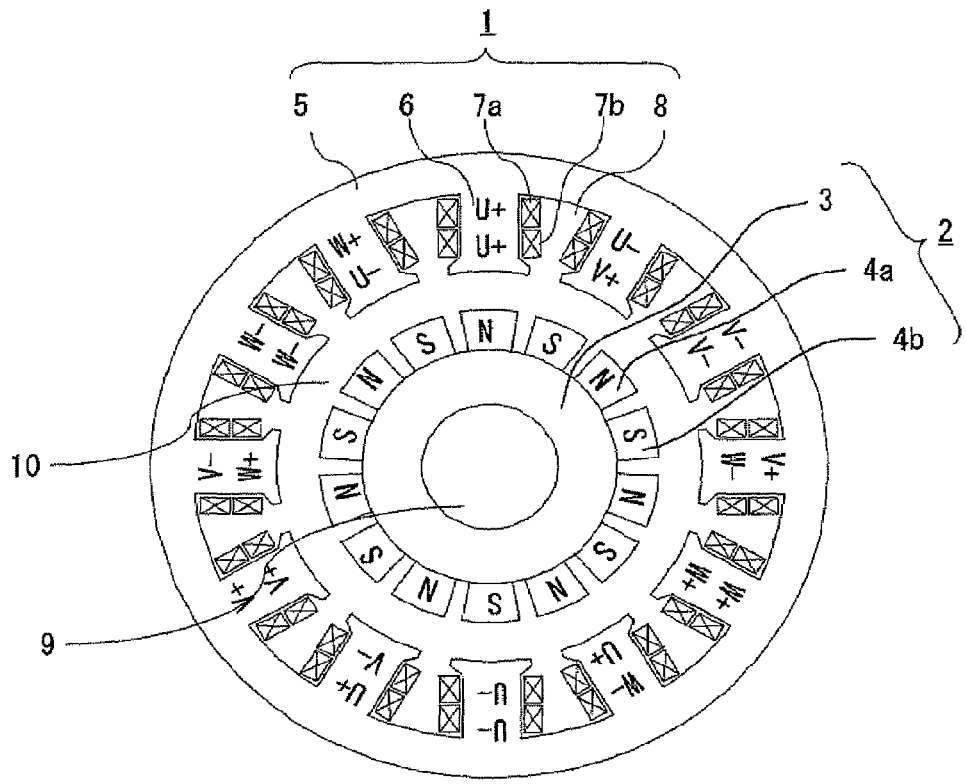
FIG. 11 is a sectional diagram showing the structure of an electric machine according to a third embodiment of the invention.

FIG. 11 is a sectional diagram showing the structure of an electric machine according to a third embodiment of the invention which is a 3-phase, 14-pole, 12-tooth rotating electric machine, in which elements identical or similar to those of the foregoing embodiments are designated by like reference numbers. Although the rotating electric machine of this embodiment is a 14-pole type, an armature 1 has the same structure as that of the first embodiment. In this rotating electric machine, a 7th-order spatial harmonic component becomes as a synchronized component. Stated more generally, the synchronized component is a (7n/2)th-order spatial harmonic component in this embodiment if the number of poles "P" and the number of teeth "Q" are expressed by P=7n and Q=6n, respectively, where "n" is any even number.

Figure 12:
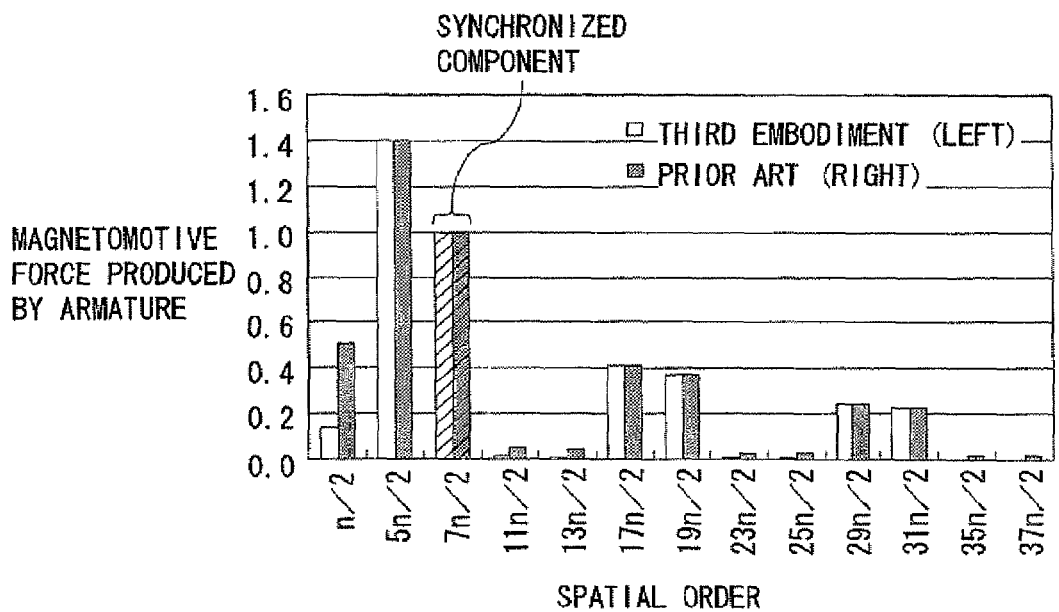
FIG. 12 is a graph showing components of individual orders of magnetomotive forces produced by an armature of the electric machine of the third embodiment.

FIG. 12 is a graph showing components of individual orders of magnetomotive forces produced by the armature 1 of the third embodiment together with the components of individual orders of the magnetomotive forces produced by the armature of the conventional rotating electric machine. It can be seen from this graph that the (n/2)th-order spatial harmonic component is lowered in level in the rotating electric machine of the third embodiment. This indicates that the structure of this embodiment serves to lower the eddy current loss like the structure of the first embodiment.

Fourth Embodiment

Figure 13:
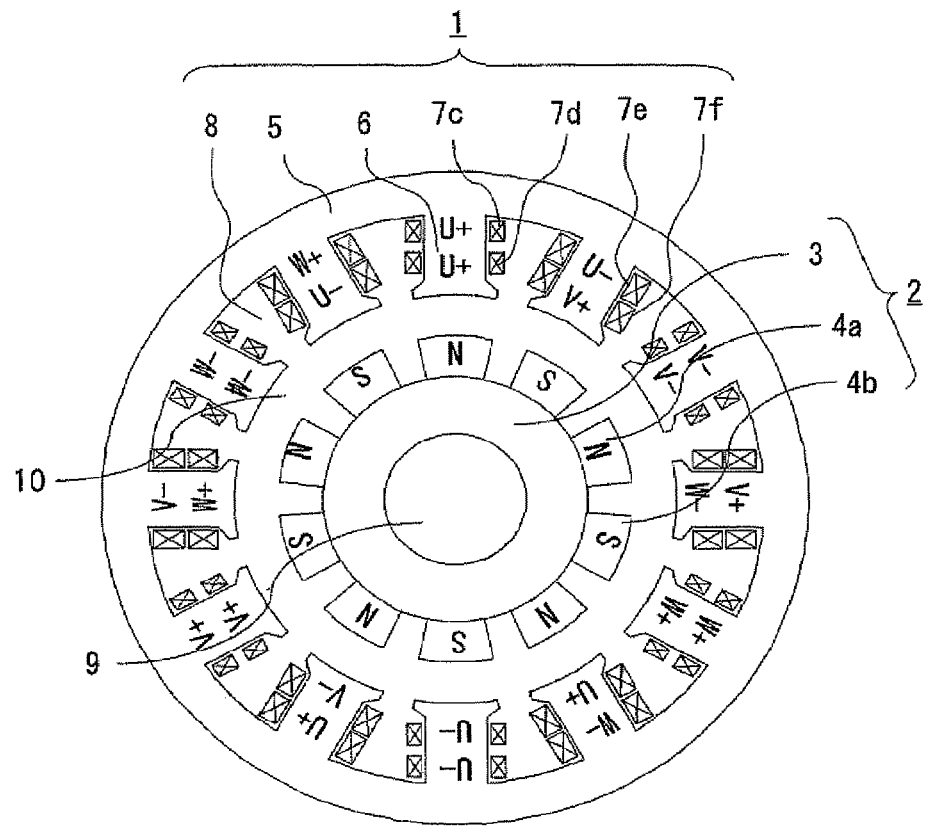
FIG. 13 is a sectional diagram showing the structure of an electric machine according to a fourth embodiment of the invention.

FIG. 13 is a sectional diagram showing the structure of an electric machine according to a fourth embodiment of the invention which is a 3-phase, 10-pole, 12-tooth rotating electric machine, for example, in which elements identical or similar to those of the foregoing embodiments are designated by like reference numbers. In the rotating electric machine of this embodiment, coils 7 wound on individual teeth 6 have different numbers of turns although the coils 7 are arranged in the same order of phases as in the foregoing first to third embodiments.

Specifically, expressing the number of turns of each of two coils 7c, 7d of a common phase wound around a single tooth 6 (e.g., the topmost tooth 6 wound by the coils 7 of U+/U+ phases as illustrated in FIG. 13) by T, the number of turns of two coils 7e, 7f of different phases wound around the adjacent tooth 6 (e.g., the tooth 6 next to the topmost tooth 6, in the clockwise directions as illustrated in FIG. 13) is $2T/\sqrt{3}$. This structure makes it possible to equalize values of combined magnetomotive forces produced by the two armature coils 7 wound around each tooth 6. Consequently, components of the magnetomotive forces produced by the armature 1 are distributed as shown in FIG. 14.

Figure 14:
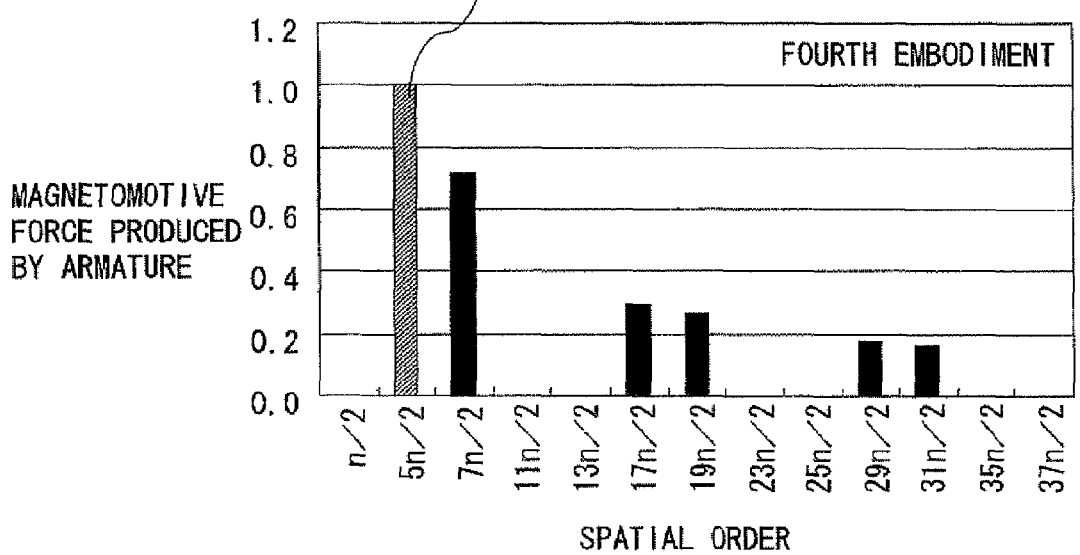
FIG. 14 is a graph showing components of individual orders of magnetomotive forces produced by an armature of the electric machine of the fourth embodiment.

The distribution of the individual components of the magnetomotive forces is shown in generalized form in FIG. 14. Specifically, FIG. 14 depicts the components of the magnetomotive forces produced in the electric machine if the number of poles "P" and the number of teeth "Q" are expressed by P=5n and Q=6n, respectively, where "n" is any even number. The (n/2)th-order spatial harmonic component has almost zero level as depicted in FIG. 14, which means that the (n/2)th-order spatial harmonic component produces almost no eddy current, so that the structure of this embodiment can further lower the eddy current loss as compared to the first to third embodiments.

The aforementioned structure of the fourth embodiment can be equally applied to a case where the number of poles "P" and the number of teeth "Q" are expressed by P=7n and Q=6n, respectively, as in the foregoing third embodiment, yet producing the same advantages.

Fifth Embodiment

A fifth embodiment described below is one form of the present invention varied from the aforementioned fourth embodiment. Specifically, an electric machine according to the fifth embodiment of the invention is characterized in that wires of two coils 7c, 7d of a common phase wound around a single tooth 6 have a cross-sectional area larger than wires of two coils 7e, 7f of different phases wound around another single tooth 6. This structure of the fifth embodiment serves to achieve an improved space factor of the coils 7 (which are made of copper wires) fitted in each single slot 8, making it possible to produce a high-efficiency rotating electric machine with reduced copper loss.

Preferably, the cross-sectional area of each wire of the coils 7c, 7d is approximately $2/\sqrt{3}$ times the cross-sectional area of each wire of the coils 7e, 7f such that total cross-sectional area of the wires (or the cross-sectional area of a single wire multiplied by the number of turns) of the two coils 7c, 7d equals total cross-sectional area of the wires of the two coils 7e, 7f.

Sixth Embodiment

Figure 15:
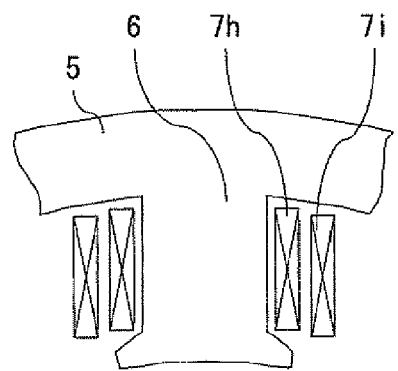
FIG. 15 is an enlarged fragmentary sectional diagram showing the structure of an electric machine according to a sixth embodiment of the invention.

FIG. 15 is an enlarged fragmentary sectional diagram showing the structure of an electric machine according to a sixth embodiment of the invention, in which elements identical or similar to those of the foregoing embodiments are designated by like reference numbers. While two coils (e.g., 7a, 7b) wound around the same tooth 6 are stacked in a radial direction of the armature 1, or an extending direction of the tooth 6, in the foregoing first to fifth embodiments, two coils 7h, 7i are wound in a double-layer arrangement around each tooth 6 with the coil 7h and the coil 7i placed in inner and outer layers, respectively, in this embodiment as shown in FIG. 15. The aforementioned advantages of the first to fifth embodiments are equally obtained even if the coils are arranged as shown in FIG. 15. It follows that the invention can be applied regardless of how the two coils wound around each tooth 6 are arranged in the slots 8.

Seventh Embodiment

Figure 16:
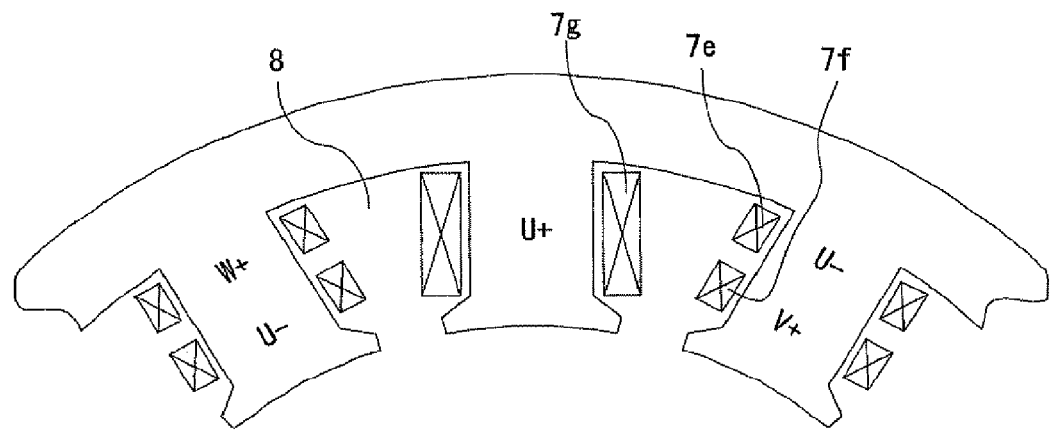
FIG. 16 is an enlarged fragmentary sectional diagram showing the structure of an electric machine according to a seventh embodiment of the invention.

FIG. 16 is an enlarged fragmentary sectional diagram showing the structure of an electric machine according to a seventh embodiment of the invention, in which elements identical or similar to those of the foregoing embodiments are designated by like reference numbers. While two coils (e.g., 7a, 7b) are wound around each tooth 6 in the foregoing first to sixth embodiments, any two coils of a common phase wound around the same tooth 6 are combined into a single coil 7g of which number of turns is 2T in this embodiment. This arrangement of the embodiment is advantageous in that the total number of the coils 7 is reduced to three fourths, resulting in a reduction in the total number of components and total manufacturing cost.

Eighth Embodiment

Figure 17:
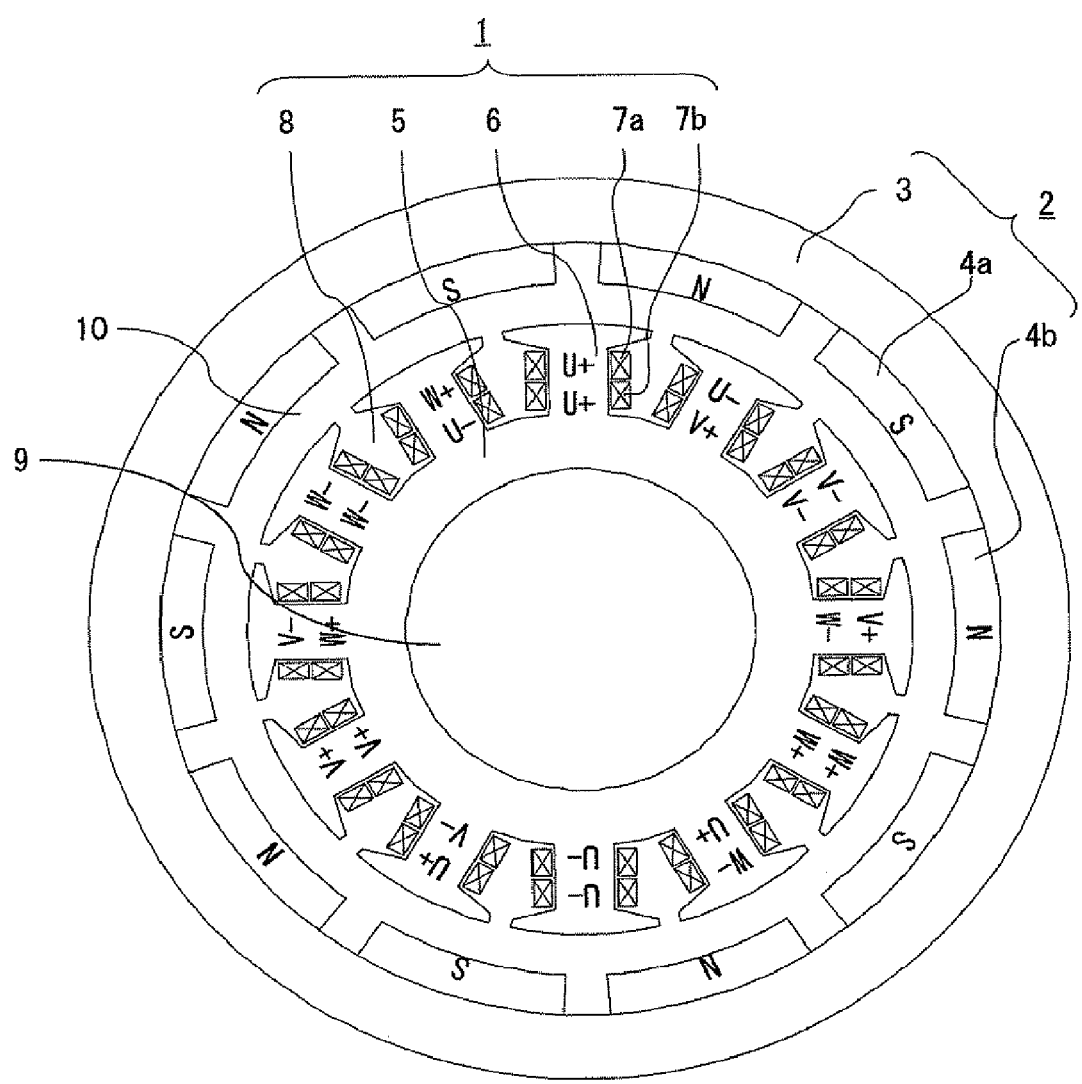
FIG. 17 is a sectional diagram showing the structure of an electric machine according to an eighth embodiment of the invention.

FIG. 17 is a sectional diagram showing the structure of an electric machine according to an eighth embodiment of the invention, in which elements identical or similar to those of the foregoing embodiments are designated by like reference numbers. While the electric machines of the first to seventh embodiments thus far described are so-called inner-rotor rotating electric machines with the field pole unit 2 located inside, it is needless to say that the present invention is applicable to outer-rotor rotating electric machines like the one shown in FIG. 17 in which the field pole unit 2 is located outside.

In addition, the invention is equally applicable to either electric motors or generators.

Ninth Embodiment

Figure 18:
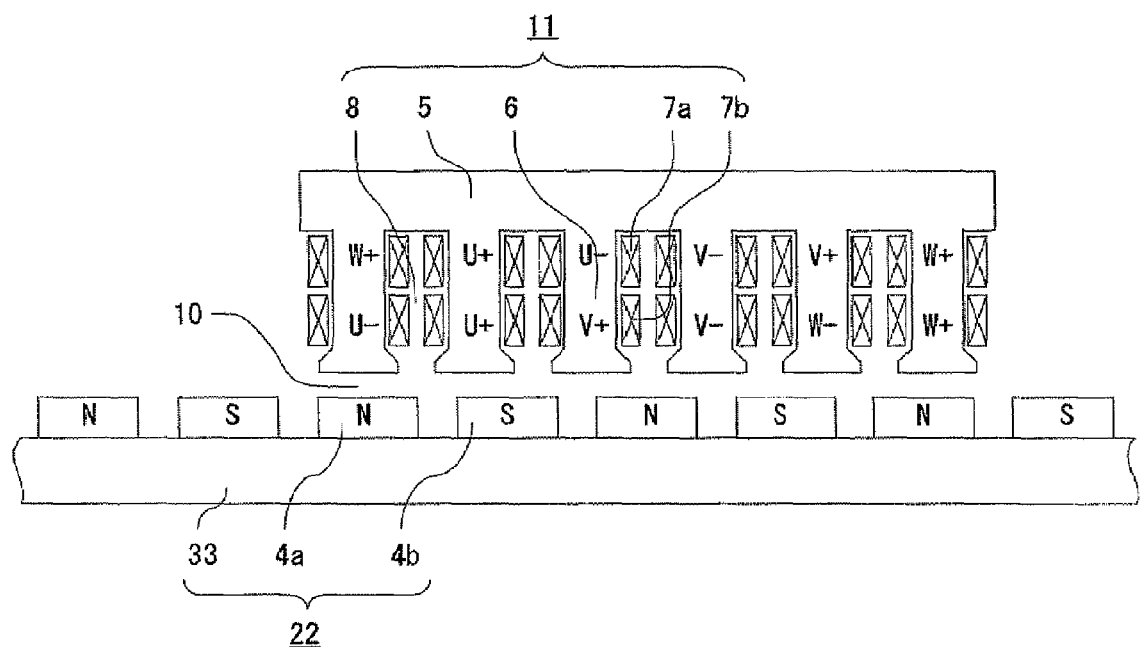
FIG. 18 is a fragmentary sectional diagram showing the structure of an electric machine according to a ninth embodiment of the invention.

FIG. 18 is a fragmentary sectional diagram of an electric machine according to a ninth embodiment of the invention which is a linear motor structured as if a rotating electric machine is stretched into linear form. While the rotating electric machines of the foregoing embodiments each have the armature 1 which is loop-shaped in cross section, the number of poles "P" and the number of teeth "Q" being multiples of an even number "n," both the number of poles and the number of teeth are defined as multiples of a natural number "m" in the case of a linear motor whose armature has definite ends.

As shown in FIG. 18, the linear motor of the embodiment includes an armature 11 constituting a moving member (which can move in either direction) and a field pole unit 22 constituting a stationary member having a large number of N-pole permanent magnets 4a and S-pole permanent magnets 4b depending on a total travel distance of the armature 11. The number of poles "P" and the number of teeth "Q" with which the present invention is concerned are for a range in which the armature 11 and the field pole unit 22 of electric machine of the embodiment functioning as a linear motor face each other. Specifically, FIG. 18 shows an example in which the number of poles expressed as P=5m is 5 and the number of teeth expressed as Q=6m is 6 by substituting "1" for "m" (m=1). The aforementioned structure of this embodiment is similarly applicable when the number of poles is defined as P=7m and the number of teeth is defined as Q=6m.

In the linear motor of this embodiment, coils 7a, 7b are wound around successive teeth 6 with phase relationships and winding polarities arranged in the order of 1: U+/U+, 2: U−/V+, 3: V−/V−, 4: W−/V+, 5: W+/W+, 6: W−/U+, 7: U−/U−, 8: U+/V−, 9: V+/V+, 10: W+/V−, 11: W−/W− and 12: W+/U− as expressed by analogy with the earlier-described first embodiment, where successive phase/winding-polarity combinations are numbered 1 through "12" (1st to 12th combinations), respectively, for the sake of simplicity in the following explanation. The armature 11 includes the coils 7a, 7b which are arranged in a single sequence or repeated sequences of the phase/winding-polarity combinations shown above. Alternatively, the armature 11 may include the coils 7a, 7b of only part of the aforementioned sequence of the phase/winding-polarity combinations (1st to 12th).

Specifically, the armature 11 is provided with 6m pairs (=6 pairs in the example of FIG. 18) of coils 7a, 7b arranged in a sequence of phase/winding-polarity combinations chosen from the aforementioned sequence. To be more specific, the coils 7a, 7b of the armature 11 shown in FIG. 18 are arranged in a sequence of six successive phase/winding-polarity combinations including the 12th (marked "W+/U−") and 1st (marked "U+/U+T") to 5th (marked "W+/W+") phase/winding-polarity combinations which are wound around the corresponding six successive teeth 6 arranged rightward from the leftmost tooth 6. Needless to say, the armature 11 may include six pairs of coils 7a, 7b arranged in a sequence of U+/U+, U−/V+, V−/V−, W−/V+, W+/W+ and W−/U+ phase/winding-polarity combinations.

The above-described coil winding structure of the present embodiment can reduce magnetomotive force components of lower orders than a synchronized component among all harmonic components of magnetomotive forces produced by the armature 11 that are not synchronized with magnetomotive forces produced by a field pole unit 22. Therefore, the structure of the embodiment can decrease eddy currents flowing in the field pole unit 22, making it possible to lower eddy current loss occurring in the field pole unit 22.

In particular, when the armature 11 moves in the linear motor in which the armature 11 is shorter than the field pole unit 22, magnetic flux produced by the magnetomotive forces of the armature 11 swiftly becomes linked to a portion of the field pole unit 22 where the magnetic flux has not been interlinked. For this reason, a voltage obtained by differentiation of the magnetic flux is rapidly excited, causing a larger amount of eddy current loss than in the rotating electric machine. However, the aforementioned structure of the embodiment can greatly decrease the magnetic flux which causes the eddy current loss.

While the armature 11 constitutes the moving member and the field pole unit 22 constitutes the stationary member in the example of FIG. 18, the present embodiment can also be applied to a linear motor of which armature and field pole unit constitute a stationary member and a moving member, respectively. Additionally, the above-described structure of the electric machine of this embodiment can also be applied to a wide range of linearly driven linear electric machines which may either be motors or generators.

In one aspect of the invention, the electric machine works as a rotatably driven rotating electric machine in which the number of poles "P" of the field pole unit and the number of teeth "Q" of the armature are expressed by P=5n and Q=6n, or P=7n and Q=6n, respectively, where "n" is an even number, wherein armature coils are wound around the successive teeth with phase relationships and winding polarities arranged in the repeatable order of U+/U+, U−/V+, V−/V−, W−/V+, W+/W+, W−/U+, U−/U−, U+/V−, V+/V+, W+/V−, W−/W− and W+/U−, where "U," "V" and "W" represent phases of the individual armature coils while "+" and "−" signs denote winding polarities thereof.

Among all harmonic components of magnetomotive forces produced by the armature coils that are not synchronized with magnetomotive forces produced by the field pole unit, harmonic components of lower orders than a synchronized component can be reduced in this electric machine. This structure of the invention serves to decrease eddy currents flowing in the field pole unit, making it possible to lower eddy current loss occurring in the field pole unit of the rotating electric machine.

In another aspect of the invention, the electric machine works as a linearly driven linear electric machine in which the number of poles "P" of the field pole unit and the number of teeth "Q" of the armature within a range in which the field pole unit and the armature of the electric machine face each other and magnetic flux can be interlinked are expressed by P=5m and Q=6m, or P=7m and Q=6m, respectively, where "m" is a natural number, wherein armature coils are wound around the successive teeth with phase relationships and winding polarities arranged in the repeatable order of U+/U+, U−/v+, V−/V−, w−/V+, W+/W+, W−/U+, U−/U−, U+/V−, V+/V+, W+/V−, W−/W− and W+/U−, where "U," "V" and "W" represent phases of the individual armature coils while "+" and "−" signs denote winding polarities thereof.

Among all harmonic components of magnetomotive forces produced by the armature coils that are not synchronized with magnetomotive forces produced by the field pole unit, harmonic components of lower orders than a synchronized component can be reduced in this electric machine. This structure of the invention serves to decrease eddy currents flowing in the field pole unit, making it possible to lower eddy current loss occurring in the field pole unit of the linear electric machine.

In another aspect of the invention, the electric machine is such that, expressing the number of turns of each of two armature coils of a common phase wound around a single tooth by T, the number of turns of two armature coils of different phases wound around another single tooth is 2T/. This structure serves to further lower the eddy current loss.

In still another aspect of the invention, the electric machine is such that wires of two armature coils of a common phase wound around a single tooth have a cross-sectional area larger than wires of two armature coils of different phases wound around another single tooth. This structure serves to decrease copper loss occurring in the armature.

In yet another aspect of the invention, the electric machine is such that any two armature coils of a common phase wound around a single tooth are combined into a single winding. This structure serves to reduce the number of components and total manufacturing cost.

Various modifications and alterations of this invention will be apparent to those skilled in the art without departing from the scope and spirit of this invention, and it should be understood that this is not limited to the illustrative embodiments set forth herein.

What is claimed is:

1. An electric machine comprising:
an armature; and
a field pole unit rotating relative to said armature along a magnetic gap between said armature and said field pole unit, said armature including:
an armature core having a plurality of teeth extending toward the magnetic gap at a uniform interval along a rotational direction of said armature relative to said field pole unit, and
a plurality of armature coils concentratedly wound around respective teeth for the flow of phase currents from a three-phase AC power supply, wherein
said field pole unit has a fixed number of magnetic poles arranged along the rotational direction,
said plurality of teeth include at least one tooth around which at least two armature coils for the flow of different phase currents are wound to reduce harmonic components of magnetomotive forces produced by the armature coils when said electric machine is operated, the reduced harmonic components being of a lower order than a component synchronized with relative moving speed of said armature and said field pole unit,
the number of poles P of said field pole unit and the number of teeth Q of said armature are selected from one of the combinations consisting of P=5n and Q=6n, and P=7n and Q=6n, respectively, where n is an even number, and
said armature coils are wound around successive teeth with phase relationships and winding polarities arranged in the repeating order of U+/U+, U−/V+, V−/V−, W−/V+, W+/W+, W−/U+, U−/U−, U+/V−, V+/V+, W+/V−, W−/W−, and W+/U−, where U, V, and W represent phases of individual armature coils and + and − denote winding polarities of said armature coils.

2. The electric machine according to claim 1, wherein, expressing the number of turns of each of two armature coils of a common phase wound around a single tooth by T, the number of turns of two armature coils of different phases wound around another single tooth is 2T/√3.

3. The electric machine according to claim 2, wherein wires of two armature coils of a common phase wound around a single tooth have a cross-sectional area larger than wires of two armature coils of different phases wound around another single tooth.

4. The electric machine according to claim 1, wherein any two armature coils of a common phase wound around a single tooth are combined into a single winding.

5. An electric machine comprising:
an armature; and
a field pole unit movable relative to said armature along a magnetic gap between said armature and said field pole unit, said armature including:
an armature core having a plurality of teeth extending toward the magnetic gap at a uniform interval along a moving direction of said armature relative to said field pole unit, and
a plurality of armature coils concentratedly wound around respective teeth for the flow of phase currents from a three-phase AC power supply, wherein
each tooth has concentratedly wound, around the respective tooth, a corresponding plurality of the armature coils,
said field pole unit has a fixed number of magnetic poles arranged along the moving direction, and
said plurality of teeth include at least one tooth around which at least two armature coils for the flow of different phase currents are wound to reduce harmonic components of magnetomotive forces produced by the armature coils when said electric machine is operated, the reduced harmonic components being of a lower order than a component synchronized with relative moving speed of said armature and said field pole unit.

6. The electric machine according to claim 5, in which said armature moves linearly relative to said field pole unit, wherein
the number of poles P of said field pole unit and the number of teeth Q of said armature are within a range in which said field pole unit and said armature of said electric machine face each other and magnetic flux can be interlinked and are selected from one of the combinations consisting of P=5m and Q=6m, and P=7m and Q=6m, respectively, where m is a natural number, and
said armature coils are wound around successive teeth with phase relationships and winding polarities arranged in the repeating order of U+/U+, U−/V+, V−/V−, W−/V+, W+/W+, W−/U+, U−/U−, U+/V−, V+/V+, W+/V−, W−/W−, and W+/U−, where U, V, and W represent phases of individual armature coils and + and − denote winding polarities of said armature coils.

7. The electric machine according to claim 6, wherein, expressing the number of turns of each of two armature coils of a common phase wound around a single tooth by T, the number of turns of two armature coils of different phases wound around another single tooth is 2T/√3.

8. The electric machine according to claim 7, wherein wires of two armature coils of a common phase wound around a single tooth have a cross-sectional area larger than wires of two armature coils of different phases wound around another single tooth.

9. The electric machine according to claim 6, wherein any two armature coils of a common phase wound around a single tooth are combined into a single winding.

10. The electric machine according to claim 5, in which said armature rotates relative to said field pole unit, wherein
the number of poles P of said field pole unit and the number of teeth Q of said armature are selected from one of the combinations consisting of P=5n and Q=6n, and P=7n and Q=6n, respectively, where n is an even number, and
said armature coils are wound around successive teeth with phase relationships and winding polarities arranged in the repeating order of U+/U+, U−/V+, V−/V−, W−/V+, W+/W+, W−/U+, U−/U−, U+/V−, V+/V+, W+/V−, W−/W−, and W+/U−, where U, V, and W represent phases of individual armature coils and + and − denote winding polarities of said armature coils.

11. The electric machine according to claim 10, wherein, expressing the number of turns of each of two armature coils of a common phase wound around a single tooth by T, the number of turns of two armature coils of different phases wound around another single tooth is $2T/\sqrt{3}$.

12. The electric machine according to claim 11, wherein wires of two armature coils of a common phase wound around a single tooth have a cross-sectional area larger than wires of two armature coils of different phases wound around another single tooth.

13. The electric machine according to claim 10, wherein any two armature coils of a common phase wound around a single tooth are combined into a single winding.

* * * * *